United States Patent [19]

Thode

[11] 4,272,319
[45] Jun. 9, 1981

[54] DEVICE AND METHOD FOR ELECTRON BEAM HEATING OF A HIGH DENSITY PLASMA

[75] Inventor: Lester E. Thode, Los Alamos, N. Mex.

[73] Assignee: The United States of America as represented by the United States Department of Energy, Washington, D.C.

[21] Appl. No.: 71,603

[22] Filed: Aug. 31, 1979

Related U.S. Application Data

[63] Continuation-in-part of Ser. No. 882,024, Feb. 28, 1978, abandoned.

[51] Int. Cl.$^3$ .................. G21G 4/02; B23K 9/00; G21B 1/00
[52] U.S. Cl. ............................... 176/5; 176/1; 250/500; 219/121 EB
[58] Field of Search ............... 176/1, 5; 250/398, 402, 250/501, 500; 313/61 R, 55, 57; 328/228; 219/121 EB

[56] References Cited

U.S. PATENT DOCUMENTS

| | | | |
|---|---|---|---|
| 3,218,235 | 11/1965 | Ehler | 176/1 |
| 3,746,860 | 7/1973 | Shatas et al. | 176/1 |
| 3,864,640 | 2/1975 | Bennett | 176/1 |
| 3,946,240 | 3/1976 | Roberts et al. | 176/1 |
| 3,959,659 | 5/1976 | Roberts et al. | 176/1 |
| 3,969,628 | 7/1976 | Roberts et al. | 176/1 |

FOREIGN PATENT DOCUMENTS 267574  7/1964  Australia ..................... 176/1

OTHER PUBLICATIONS

CONF-750905-P2, pp. 172-185 (9/75), Rudakov et al., Investigations on the Powerful Electron Beam Applications for Fusion 176-1.
Physics Today, (5/75), pp. 35-43, High Current Electron Beams, Fleishman.
IEEE Transactions on Plasma Science, vol. PS-3, No. 4 (12/75), Roberts et al., pp. 216-221.
Journal of Applied Physics, vol. 47, No. 12, (12/76), Read et al., pp. 5236-5241.
Physics of Fluids, vol. 19, No. 6 (6/76), Thode, pp. 831-848.
J. Appl. Physics, vol. 44, No. 11, (11/73), pp. 4913-Mather et al.
Sov. Tech, Phys. Lett., vol. 2, No. 1 (1/76), pp. 20-22, Kiselev et al.
Physics of Fluids, vol. 20, No. 12 (12/77), pp. 2121-2127.

*Primary Examiner*—S. A. Cangialosi
*Attorney, Agent, or Firm*—William W. Cochran, II; Paul D. Gaetjens; James E. Denny

[57] ABSTRACT

A device and method for relativistic electron beam heating of a high density plasma in a small localized region. A relativistic electron beam generator produces a high voltage electron beam which propagates along a vacuum drift tube and is modulated to initiate electron bunching within the beam. The beam is then directed through a low density gas chamber which provides isolation between the vacuum modulator and the relativistic electron beam target. The relativistic beam is then applied to a high density target plasma which typically comprises DT, DD, hydrogen boron or similar thermonuclear gas at a density of $10^{17}$ to $10^{20}$ electrons per cubic centimeter. The target plasma is ionized prior to application of the electron beam by means of a laser or other preionization source. Utilizing a relativistic electron beam with an individual particle energy exceeding 3 MeV, classical scattering by relativistic electrons passing through isolation foils is negligible. As a result, relativistic streaming instabilities are initiated within the high density target plasma causing the relativistic electron beam to efficiently deposit its energy into a small localized region within the high density plasma target.

17 Claims, 13 Drawing Figures

DEVICE AND METHOD FOR ELECTRON BEAM HEATING OF A HIGH DENSITY PLASMA

It is a result of contract W-7405-ENG-36 with the Department of Energy.

CROSS REFERENCE TO RELATED APPLICATION

This application is a continuation in part of application Ser. No. 882,024, filed Feb. 28, 1978 now abandoned.

BACKGROUND OF THE INVENTION

Field of the Invention

The present invention pertains generally to dense plasma heating and more particularly to plasma heating by way of a relativistic electron beam.

Plasma heating has, for some time, been of great interest to the scientific community, since heated plasmas can be utilized for a wide variety of functions. A typical use of a hot plasma is the generation of energy in the form of a radiation, neutrons, and alpha particles. Such an energy source can be useful in basic high energy density plasma physics research, with practical application in scientific areas such as controlled thermonuclear fusion, materials studies, and radiography.

DESCRIPTION OF THE BACKGROUND OF THE INVENTION

Numerous techniques have been proposed in the prior art to produce dense, kilovolt plasmas. One of the more well-known techniques is the compression and heating of the core of a structured pellet by a laser or low voltage electron beam. It has also been suggested that light or heavy ion beams could be utilized to obtain similar compression and heating. Accordingly, the structured pellet and its driving source are directly coupled through classical interactions by heating the outer layer of the structured pellet. Depending upon the characteristics of both the structured pellet and driving source, the outer layer explodes or ablates, leading to compression and heating of the core. Due to the direct coupling of all of these driving sources, preheat of the core has been found to reduce the effectiveness of the compression, thereby, reducing both density and temperature of the pellet core.

The use of a laser as a driving source in the above described confinement system has the added inherent disadvantages of low efficiency and associated high development cost in producing lasers with the required power output for a directly driven structured pellet. Also, diffraction limitations and window damage thresholds make it difficult to focus proposed large lasers to millimeter diameters.

Low impedance electron and light ion beams also face expensive technological advancement in order to focus these beams to millimeter diameters, and to obtain power levels necessary to achieve the desired compression of the structured pellet. Such sources have the additional disadvantage of limitations in the manner of propagation of the beam to the pellet.

Heavy ion sources also require significant technological advancement to produce the desired compression of the structured pellet. In fact, development of heavy ion sources using conventional accelerator concepts appears to be considerably more expensive than the cost associated with the development of lasers. Propagation of the beam to the pellet is also a limitation when employing this concept.

Another manner of producing high density, kilovolt plasmas is the use of fast liners. Such devices can be driven by either magnetic forces or high explosives, both of which lead to compression and heating of an interior plasma. Although both of these fast liner techniques have produced energy in the form of radiation, neutrons, and alpha particles, just as the inertially confined laser and low impedance electron beam driven plasmas described above, each technique has its own inherent disadvantage. The primary disadvantage of the high explosive driven liner is that the high explosives have a maximum power density of approximately $10^{10}$ watts/cm$^3$ and a maximum detonation velocity of $8.8 \times 10^5$ cm/sec, which limits the liner implosion velocity that can be achieved. Although useful in obtaining scientific data, such a system, would, needless to say, be difficult to develop into a reuseable apparatus.

As to magnetically driven liners, the liner forms part of the electrical discharge circuit in which current flowing through the liner creates a large $B_\theta$ field which causes the liner to compress. Since the liner forms part of the electrical circuit, the external circuit resistance and finite liner resistivity lead to ohmic losses which lower the efficiency of converting electrical energy into liner kinetic energy. Also, since the liner must make electrical contact with the circuit, damage to the electrode connection between the moving liner and the electrode limits operability.

For liners which essentially remain thin solid shells during the implosion, ohmic heating and magnetic field diffusion limits implosion velocities to approximately 1 cm/$\mu$sec. To obtain the desired radiation, neutron, and alpha particle energy at such low implosion velocities, the plasma within the liner must be preionized and complex methods of overcoming heat conduction losses must therefore be incorporated into the system.

Although liner implosion velocities exceeding 1 cm/$\mu$sec can be achieved, ohmic heating and magnetic field diffusion converts solid liners into plasmas during operation. As a result, the thickness of the liner is increased, which lowers the potential for power multiplication. Even with very thin foils, implosion velocities are limited by the risetime of the driving current and the diffusion of the driving magnetic field through the plasma liner.

Lasers have also been used to directly heat a magnetically confined plasma. According to this concept, a laser is used to heat a large volume of plasma to a thermonuclear temperature which is confined by an elaborate magnetic field system. Although the laser provides uniform ionization and rapid heating of a low temperature plasma, the characteristic deposition length increases approximately as $T^{3/2}$ for plasma electron temperatures, T > 10 eV. This characteristic of the deposition of laser energy in the plasma coupled with the large volume of plasma to be heated, places a total energy requirement for the laser which substantially exceeds present technology. Even if such lasers could be developed, the inherent low efficiencies associated with lasers would result in a large capital investment in such a system.

A similar system incorporates a light or heavy ion beam to deposit its energy in a magnetically confined plasma. Since such beams are nonrelativistic, they exhibit a very low coupling efficiency and lack versatility obtainable by the relativistic interaction.

Figure 1:
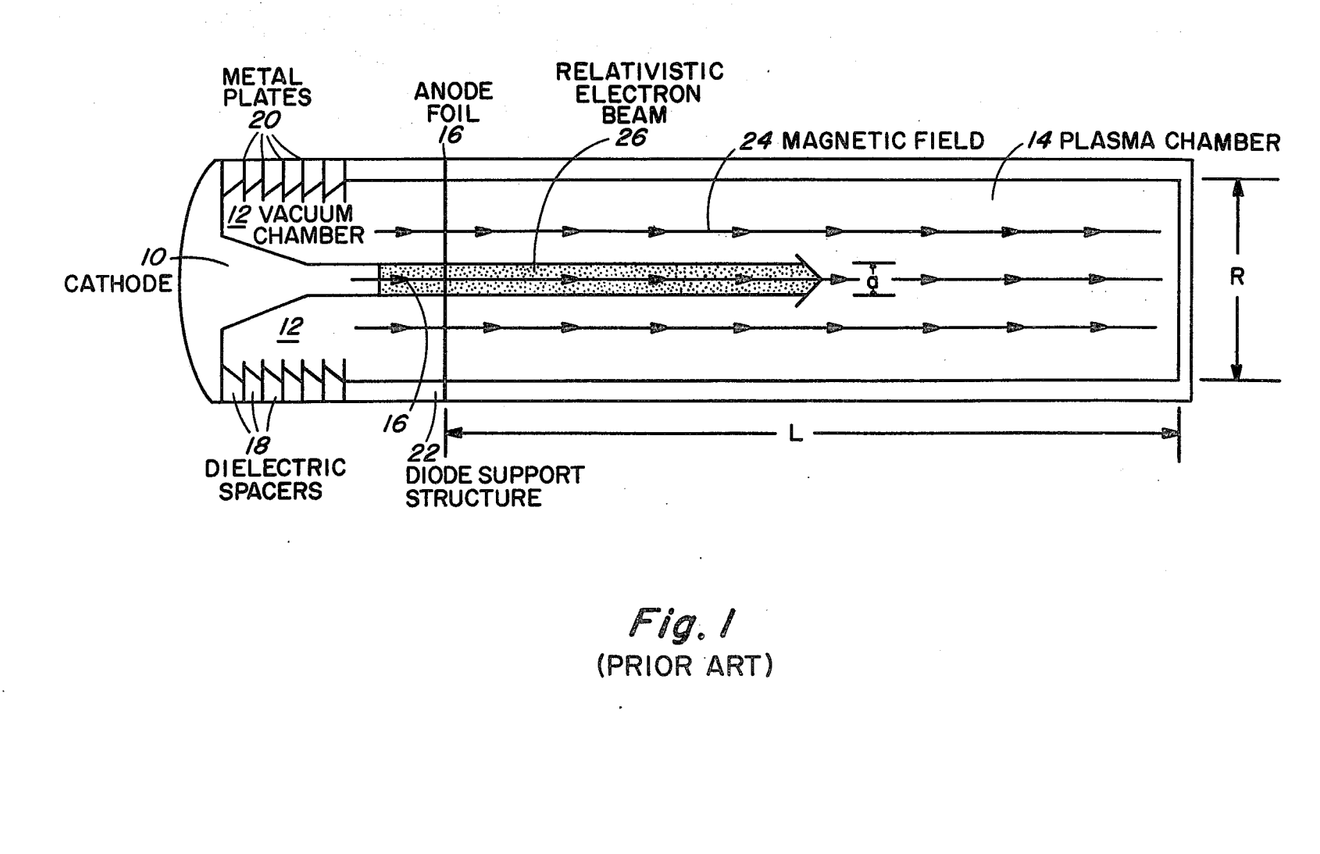
FIG. 1 is a schematic illustration of a typical prior art relativistic electron beam plasma heating device.

The concept of using an intense relativistic electron beam to heat a confined plasma has been investigated experimentally for a number of years. Prior art experiments have concentrated primarily on heating a large volume of plasma to a thermonuclear temperature with the electron beam, while maintaining the plasma with an external magnetic field. A typical configuration of a prior art experimental apparatus is shown in FIG. 1. A cathode 10 is positioned within a vacuum chamber 12 which is separated from the plasma chamber 14 by an anode foil 16. A series of dielectric spacers are separated by a series of metal plates 20 which function to prevent breakdown between the cathode 10 and the diode support structure 22. A solenoidal or mirror magnetic field configuration 24 is produced by an external source along the axial direction of the device.

In operation, a relativistic electron beam 26 is formed by charging the cathode 10 with a fast risetime high voltage pulse, causing electrons to be emitted from the cathode 10 penetrating the anode foil 16 so as to enter the plasma chamber 14 as a relativistic electron beam 26. As the relativistic beam propagates through the plasma along the externally applied axial magnetic field 24, the plasma is heated by the following methods:

(a) relaxation heating due to relativistic streaming instabilities (two-stream and upper-hybrid instabilities), and (b) anomalous resistive heating due to the presence of a plasma return current (ion-acoustic and ioncyclotron instabilities).

Typically, devices such as klystrons, magnetrons, vacuum tubes, etc., which are based upon electron bunching have been considered very efficient devices with respect to energy utilization. Therefore, the process of heating a plasma by electron bunching, i.e., method (a) by generating the two-stream and upper-hybrid instabilities, was initially expected to be an efficient technique for producing a thermonuclear plasma. Although all early experiments observed anomalous (nonclassical) coupling of the beam energy to the plasma resulting from the presence of the streaming instabilities, the coupling efficiency was only on the order of 15% at plasma densities of $\approx 10^{12}$ electrons/cm$^3$ and dropped rapidly to less than a few percent as the plasma density approached $10^{14}$ electrons/cm$^3$. These results were obtained with anode foils having thicknesses on the order of 25 to 50 $\mu$m and conventional electron beams available during this period which typically had relatively low voltages, i.e., 1 MeV or less. This combination of relatively thick anode foils and low voltage beams, caused classical anode foil scattering which prevented the relativistic streaming instabilities from efficiently coupling the beam energy to the plasma. In other words, although unknown to the experimentalists and theoreticians during the period 1970-1975, the foil thickness and low voltages of the electron beam used in the experiments caused the electron beam to scatter in a manner which prevented substantial electron bunching in the beam. This, in turn, produced the observed rapidly decreasing energy absorption efficiencies as the plasma density approached $10^{14}$ electrons/cm$^3$. As a result of these low observed efficiencies, scientific attention shifted toward investigation of the resistive heating mechanism which was known to have several scientifically interesting properties.

One property of the resistive heating mechanism is its ability to place a substantial fraction of the beam energy into plasma ions. This differs from the streaming instabilities which primarily heat the plasma electrons. Since the ions must eventually be heated in magnetically contained plasmas, direct heating of the ions eliminates an energy conversion step. Furthermore, when energy is initially deposited into plasma electrons rather than the ions, heat conduction is enhanced due to the initially elevated electron temperature, so that achievable plasma confinement time is shortened. Consequently, increased magnetic field strengths are required to produce comparable confinement.

Figure 2:
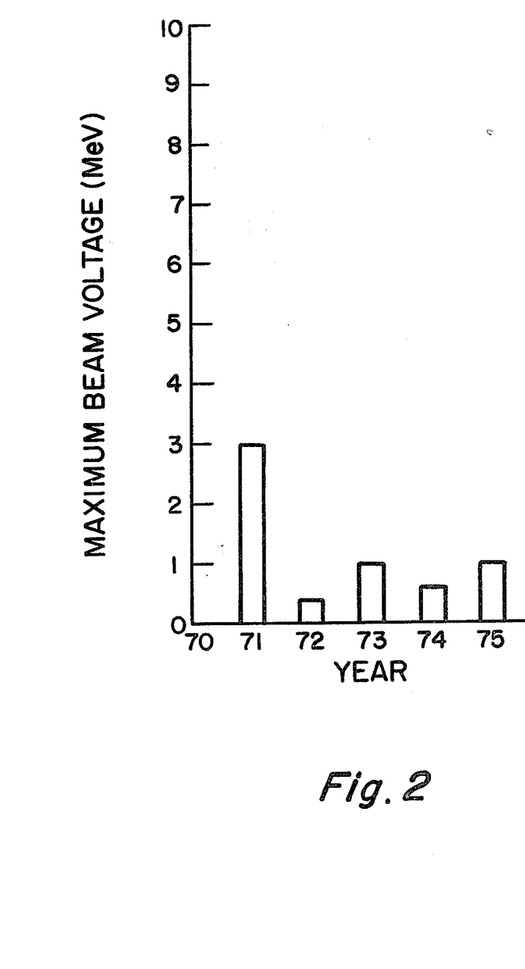
FIG. 2 is a graph of maximum experimental relativistic electron beam voltages utilized from 1970 to 1975.
Figure 3:
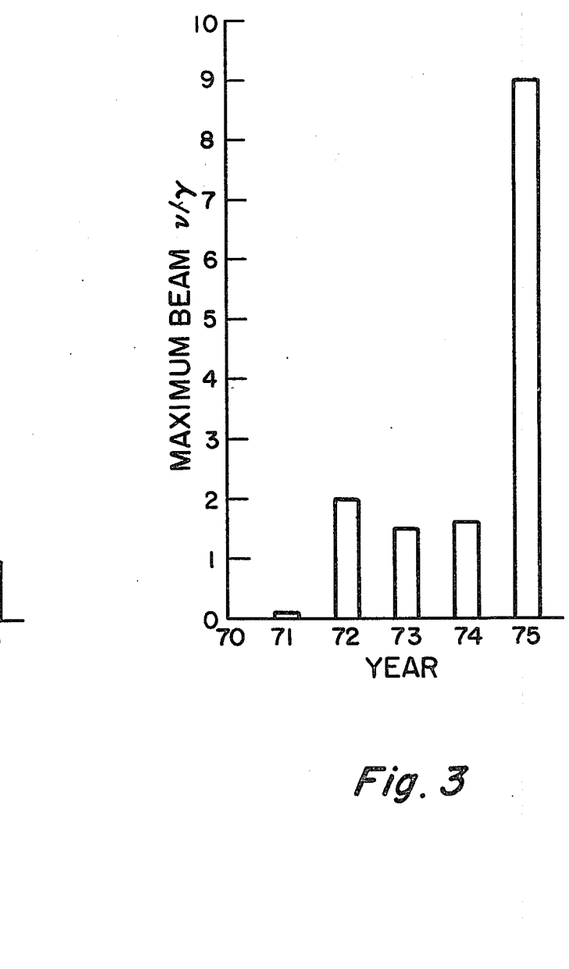
FIG. 3 is a graph of maximum experimental $v/\gamma$ of relativistic electron beams utilized from 1970 to 1975.

Another property of the resistive heating mechanism is its ability to heat a large volume of plasma in a uniform manner, rather than depositing energy in a small localized region, as is characteristic of the optimized streaming instability mechanism. The ability to directly heat a large volume of plasma in a uniform manner by resistive heating thus avoids problems of heat redistribution within the plasma. Moreover, the potential for developing a plasma heating system which could also be used in conjunction with devices requiring preheated plasmas and which, additionally have high political priority such as tokamaks, renders the resistive heating mechanism even more attractive. For these reasons, experimental attention was directed from the onset of plasma heating experiments by relativistic electron beams towards producing resistive heating in plasmas. Consequently, experimental apparatus to optimize resistive heating effects, such as low voltage electron beams with high $\nu/\gamma$ outputs, were utilized in ongoing experiments of relativistic electron beam heated plasmas. Here, $\gamma$ is the beam relativistic factor which is nearly proportional to the beam particle voltage. The ratio $\nu/\gamma$ is basically a measure of the beam magnetic energy to beam particle kinetic energy. The increased use of high $\nu/\gamma$ beams is more graphically shown in FIGS. 2 and 3 which illustrate the decrease in maximum beam voltage and increase in maximum $\nu/\gamma$ for relativistic electron beam experiments between 1970 and 1975. Thus the prior art experiments have, from the beginning, concentrated on high $\nu/\gamma$, low voltage, beams for optimizing the resistive heating mechanism, virtually ignoring the effect of streaming instabilities.

In so doing, prior art experiments, have clearly pointed out the limitations of resistive heating, i.e., that resistive heating does not scale to higher density plasmas, but, to the contrary, is absolutely limited by self-stabilization within the plasma. More particularly, the experiments have shown that above a certain electron temperature, depending on the density of the plasma, low frequency instabilities which are responsible for resistive heating, are stabilized. Consequently, only classical resistivity, which is inadequate to couple significant energy to the plasma from the relativistic electron beam, has any effect in resistively heating the plasma.

In addition to this inherent stabilization limitation, the technique of resistive heating has several other disadvantages in producing kilovolt plasmas. First, even if the experiments had shown that resistive heating was effective at high plasma density, the required $\nu/\gamma$ for efficient coupling would be at least an order of magnitude higher than that achievable by present day technology. Second, since resistive heating is not effective at high plasma densities, the mechanism is only suitable for low plasma densities which require long confinein both angle and energy, resulting in an efficient coupling of beam energy to the plasma.

Figure 4:
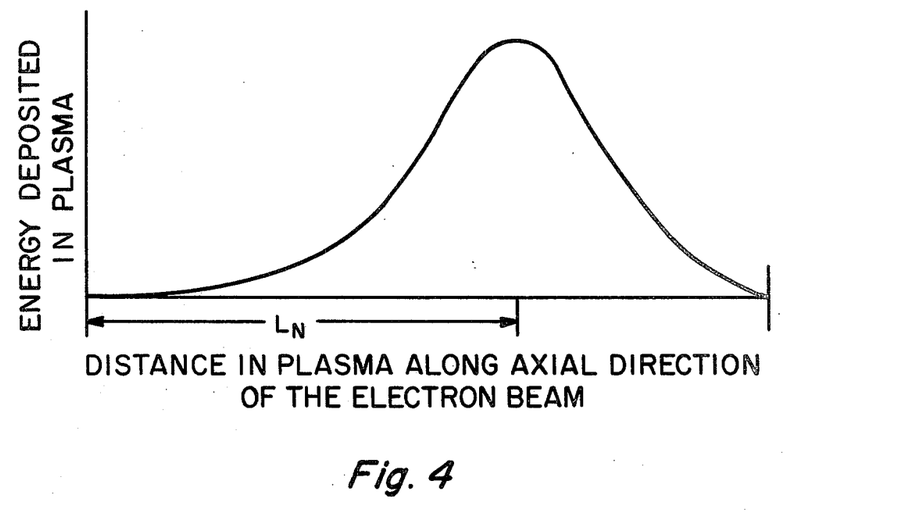
FIG. 4 is a graph of energy deposition in the axial direction of a relativistic electron beam which characteristically occurs as a result of the streaming instabilities.

The characteristic nonuniform energy deposition of the collective interaction, i.e., two-stream and upper-hybrid instabilities, is illustrated in FIG. 4. This nonuniform deposition property is utilized to concentrate energy deposited into the plasma from the relativistic electron beam, rather than allowing the energy to dissipate its explosive character by expansion into a large volume of plasma. The initial deposition of beam energy is into plasma electrons which, depending upon the parameters of the device, results (1) in heat conduction which is used propitiously to obtain power multiplication or (2) in current multiplication and confinement of the plasma. In this manner, the disadvantages of preferential heating of plasma electrons associated with magnetically confined plasmas is advantageously employed in the present invention.

Figure 5:
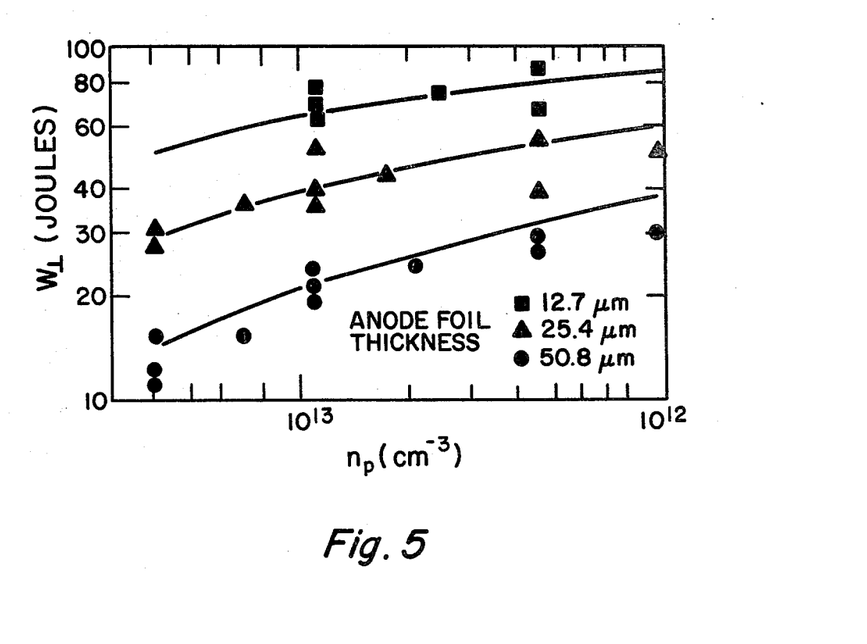
FIG. 5 is a graph of experimental relativistic electron energy deposition in a plasma versus plasma density for various foil thicknesses.

The potential efficiency of relativistic beam energy deposition into a dense plasma via the streaming instability mechanism has heretofore been unknown in the prior art. In contrast, FIG. 5 illustrates results of recent experiments performed according to the present invention in which energy deposition is plotted against plasma density for the application of a relativistic beam through anode foils having various thicknesses. As is apparent from the data of FIG. 5, a reduction in the anode foil thickness causes a great increase in deposition energy into the plasma. These results therefore indicate that the basic efficiency of the streaming instability deposition varies in the following approximate manner:

$$\text{Efficiency} = \alpha S[1 - \exp(-\alpha S/F)]/(1+\alpha S)$$

where $S \equiv (\gamma - \gamma^{-1})(n_b/2n_e)^{\frac{1}{3}}$ is the strength parameter, F is a function depending upon the foil thickness and material, $n_b$ is the beam density, $n_e$ is the plasma electron density, and $\alpha = 1.0-1.5$ is a parameter associated with beam premodulation.

It is therefore apparent from the efficiency equation that if either the beam voltage ($\gamma$) is increased or the foil function (F) reduced by decreasing the foil's effective Z or thickness, the factor $\exp(-\alpha S/F)$ approaches zero, such that the efficiency increases in direct proportion to the strength parameter to approximately $S \approx 0.60$. Thus, for high voltage beams, the coupling efficiency approaches 60% for high density plasma targets. Moreover, these coupling efficiencies can be obtained with little or no advancement in the current technology of electron beams since relativistic electron beams presently exist with voltage parameters sufficiently high to practice the present invention. As a result, currently available high voltage relativistic electron beams are capable of achieving high energy deposition due to the ability of the high voltage beams to penetrate the foil with reduced electron beam scattering. Thus, for equal energy relativistic electron beams, beams with $\mu/\gamma \approx 1$ achieve much higher coupling efficiencies via the streaming instabilities than beams designed with $\mu/\gamma \gg 1$ to optimize the resistive heating mechanism in the high density plasma target regime.

Figure 6:
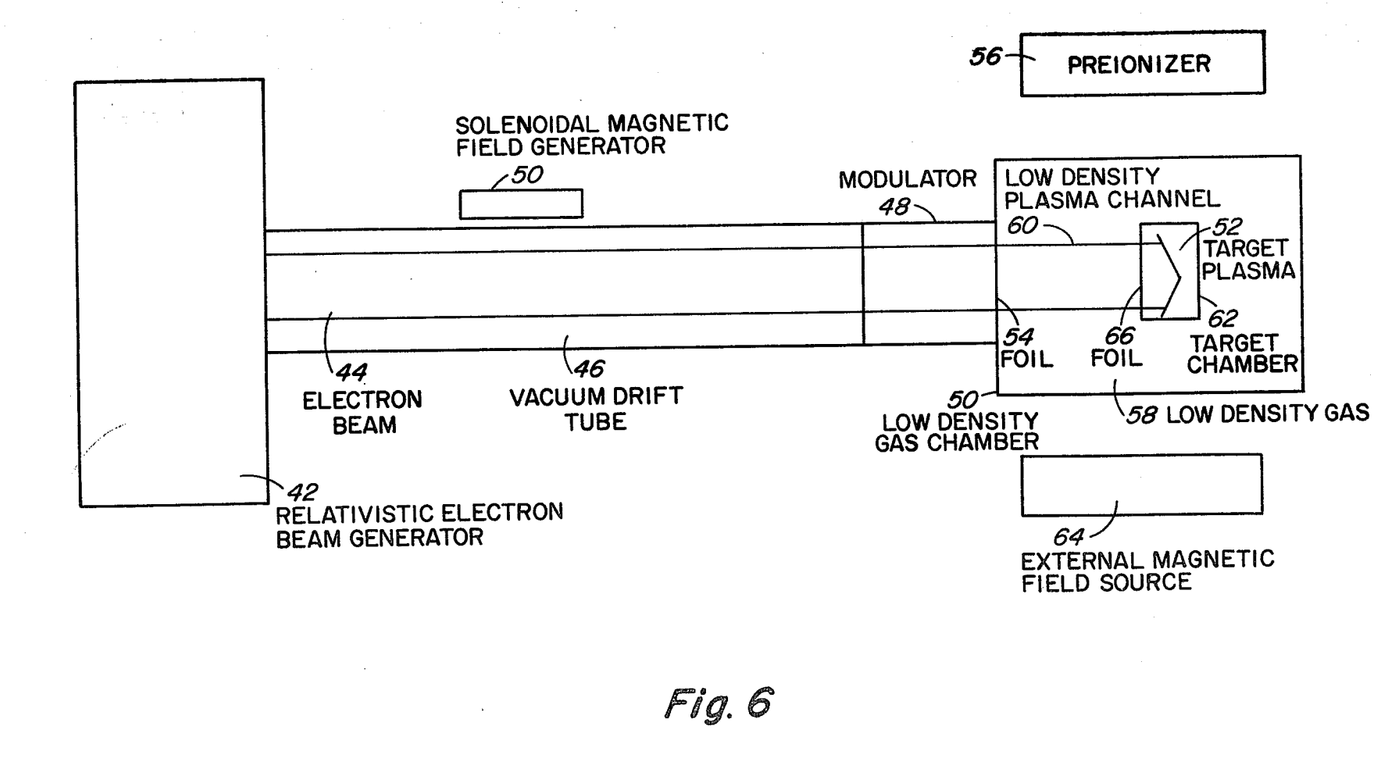
FIG. 6 is a block diagram of the device of the present invention.

FIG. 6 is a block diagram illustrating the major components of the preferred embodiment of the invention. The relativistic electron beam generator 42 produces a high voltage, i.e., 3 MeV or greater, high current density, i.e., 1 kA/cm² or greater, relativistic electron beam. A foil or foilless diode can be used to produce a solid or annular electron beam in the conventional manner, or, alternatively, a conventional high impedance generator can be used as an injector to a radial pulse line accelerator to increase the electron energy to the 100 MeV range. The relativistic electron beam 44 produced by generator 42 is propagated along the vacuum drift tube 46 to a modulator 48. A solenoidal magnetic field generator 50 generates a magnetic field along the vacuum drift tube to ensure beam equilibrium throughout the drift tube 46 and modulator 48.

Modulator 48 constitutes a portion of the vacuum drift tube and is formed by a periodic structure in the direction of the beam propagation. The periodic structure of the modulator 48 causes the beam electrons to be bunched longitudinally which allows a more stable propagation through low density gas chamber 50 and enhanced deposition in target plasma 52.

The low density gas chamber 50 provides isolation between replaceable target plasma chamber 62 and modulator 48, drift tube 46 and accelerator 42. The electron density ($n_e$) of the ionized low density gas 58 is typically close to the electron beam density ($n_b$), whereas the target plasma electron density is 4 to 6 orders of magnitude above the beam density. The low density gas 58 typically comprises $H_2$, He, Ar, $N_2$ or residual gas associated with the previous operation of the device. The high density target plasma 52 comprises DT, DD, hydrogen boron or similar gas with a fully ionized electron density ($n_e$) of $10^{17}$ to $10^{20}$ cm$^{-3}$. Foil 54 consists of a metal, e.g., Ti, Al, Be, etc. or plastic, e.g., mylar or kapton, support and a layer of plastic impregnated with high Z atoms. The foil 54 retains the vacuum in the drift tube 46 and modulator 48 and converts a portion of the rising beam impulse into Bremsstrahlung radiation which is directed predominantly along the axis of the electron beam. The Bremsstrahlung radiation creates a low density plasma channel 60 for beam propagation through the low density gas 58. Foil 66 may also be constructed similar to foil 54 to generate Bremsstrahlung radiation and provide ionization of the target plasma 52 to assist or replace preionizer 56. In the ionized low density plasma channel 60 and target plasma 52, the self fields of the beam are shorted out so that an external magnetic field is not required to achieve beam equilibrium, although overall efficiency of the device may be enhanced by the presence of a magnetic field. The beam can therefore be ballistically guided through the low density plasma channel 60 to the plasma target 52. An external magnetic field source 64 can also be used in conjunction with the preferred embodiment providing further stabilization of the relativistic electron beam within the low density gas chamber 50.

The preionizer 56, which fully ionizes the target gas in target chamber 62, constitutes any one of a number of devices for creating a fully ionized gas such as a discharge device, an exploding wire or wires, various lasers, a microwave generator, or various low energy particle beam generators. Where necessary, such as with a laser preionizer, windows formed from sapphire, salt, or other appropriate materials are formed in the plasma container 62 to allow the laser light to enter and ionize the target plasma 52. For a fully ionized density of $10^{19}$ to $10^{20}$ electrons/cm³ of the plasma 52, a 0.1 to 2 $\mu$s, 0.2 to 10 kJ HF laser can be used for the ionization source 56. A 0.1 to 2 $\mu$s, 0.2 to 5 kJ $CO_2$ laser can be used for the ionization source 56 when the fully ionized density of the plasma 52 is below $10^{19}$ electrons/cm³.

ment times, dictated by external magnetic field strengths achievable within strength of material limitations. Additionally, such plasmas are very large in volume and the total energy required to heat said plasma would again be at least an order of magnitude beyond the total beam energy achievable by present technology standards.

As a result of these limitations, and the belief by prior art theoreticians and experimentalists that resistive heating dominated anomalous energy deposition in a plasma, the relativistic electron beam plasma heating program in the United States was virtually abolished in 1975 without any further investigation into the streaming instability heating mechanism.

SUMMARY OF THE INVENTION

The present invention overcomes the disadvantages and limitations of the prior art by providing a novel method and device for relativistic electron beam heating of a high density plasma. The present invention utilizes streaming instabilities to locally heat a small volume of plasma to kilovolt temperatures. This is accomplished by utilizing $v/\gamma \simeq 1$ relativistic electron beams having high voltages in conjunction with thin foils to reduce foil scattering effects, so as to enhance the streaming instabilities. In this manner, energy from the relativistic electron beam is deposited in the plasma with very high coupling efficiency due to the anomalous effects of the streaming instabilities.

OBJECTS OF THE INVENTION

It is therefore an object of the present invention to provide an improved method and device for relativistic electron beam heating of a high density plasma.

It is also an object of the present invention to provide an improved method and device for relativistic electron beam heating of a high density plasma which is efficient in operation.

Another object of the present invention is to provide a method and device for relativistic electron beam heating of a high density plasma which is relatively inexpensive to implement and simple in operation.

Another object of the present invention is to provide a method and device for relativistic electron beam heating of a high density plasma which utilizes devices which are available according to present day or near term technology.

Another object of the present invention is to provide a method and device for relativistic electron beam heating of a high density plasma which is capable of producing energy in the form of radiation, neutrons and alpha particles.

Another object of the present invention is to provide a method and device for relativistic electron beam heating of a high density plasma which requires relatively low capital investment.

Another object of the present invention is to provide a method and device for relativistic electron beam heating of a high density plasma utilizing relativistic streaming instabilities.

Other objects and further scope of applicability of the present invention will become apparent from the detailed description given hereinafter. The detailed description, indicating the preferred embodiment of the invention is given only by way of illustration since various changes and modifications within the spirit and scope of the invention will become apparent to those skilled in the art from the detailed description. The abstract of the disclosure is for the purpose of providing a nonlegal brief statement to serve as a searching and scanning tool for scientists, engineers, and researchers and is not intended to limit the scope of the invention as disclosed herein, nor is it intended to be used in interpreting or in any way limiting the scope or fair meaning of the appended claims.

DETAILED DESCRIPTION OF THE PREFERRED EMBODIMENT OF THE INVENTION

The present invention, in contrast to prior art plasma heating techniques, takes advantage of the natural characteristics of two extremely powerful microinstabilities, i.e., the two-stream and upper-hybrid instabilities, to locally heat a small volume of plasma to kilovolt temperatures. Essentially, the instabilities are created by the relative drift between the relativistic beam electrons and target plasma electrons. Although a large number of parameters influence this collective interaction, the dominant factors in determining the strength of the instabilities are (1) beam temperature along a stream line and (2) the wavelength of the instabilities relative to the radial dimension of the target plasma.

Beam temperature along a stream line occurs primarily from the passage of the relativistic electrons of the beam through the foil dividing the low density plasma from accelerator vacuum, and the low density plasma from the high density plasma target. The effect of the foil can be made negligible by (1) increasing the electron energy, (2) reducing the thickness of the foil, or (3) reducing the effective Z of the foil material. As a result, a high voltage, i.e., exceeding 3 MeV, electron beam can penetrate a number of foils and still deposit its energy efficiently to the high density plasma.

By utilizing plasmas of high density, the wavelength of the instabilities are small compared to the radial dimensions of the plasma. Thus, although the instantaneous deposition rate can vary, the nonlinear evolution of the instability functions to relax the beam distribution In operation, the beam passes through chamber 62 where convective wave growth is initiated such that the waves e-fold until saturated through nonlinear trapping. The presence of a thin foil located at 66 defines a starting point for the wave growth, thus ensuring that the beam energy is deposited at a specified location within the target plasma 52.

Since energy is being transferred from relativistic electrons in the electron beam 44 to nonrelativistic electrons within the target plasma 52, conservation of energy and momentum require that the beam both heat and drive a large axial current in the plasma. The presence of a large axial current, in turn, initiates additional plasma heating and confinement.

Figure 7:
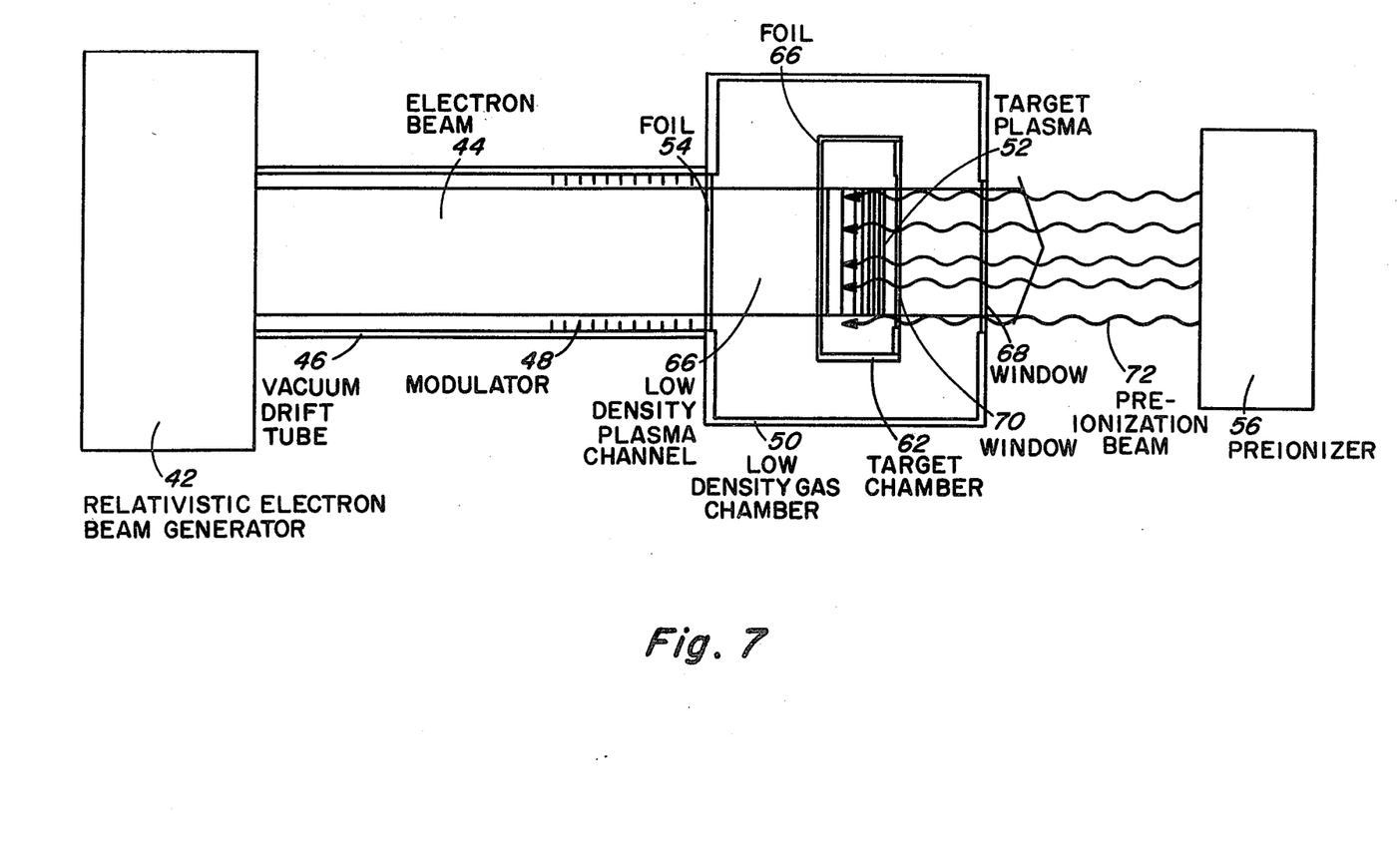
FIG. 7 is a schematic illustration of the preferred embodiment wherein a single ionization source is used.

FIG. 7 is a schematic illustration of one arrangement of the preferred embodiment. As shown, relativistic electron beam generator 42 produces a relativistic electron beam 46 which is propagated through the vacuum drift tube 44 and adjacent modulator 48. The electron beam 46 penetrates foil 54 which separates the low density gas chamber 50 from the vacuum drift tube 46 and modulator 48. A low density plasma channel 66 is formed in the low density gas chamber 50. Windows 68 and 70 allow the preionizer 56 to penetrate the low density gas chamber 50 and target chamber 62 respectively. Preionizer 56 functions to ionize the target plasma 52 such that the relativistic electron beam deposits its energy in an anomalous fashion in the target plasma 52 according to the present invention.

Figure 8:
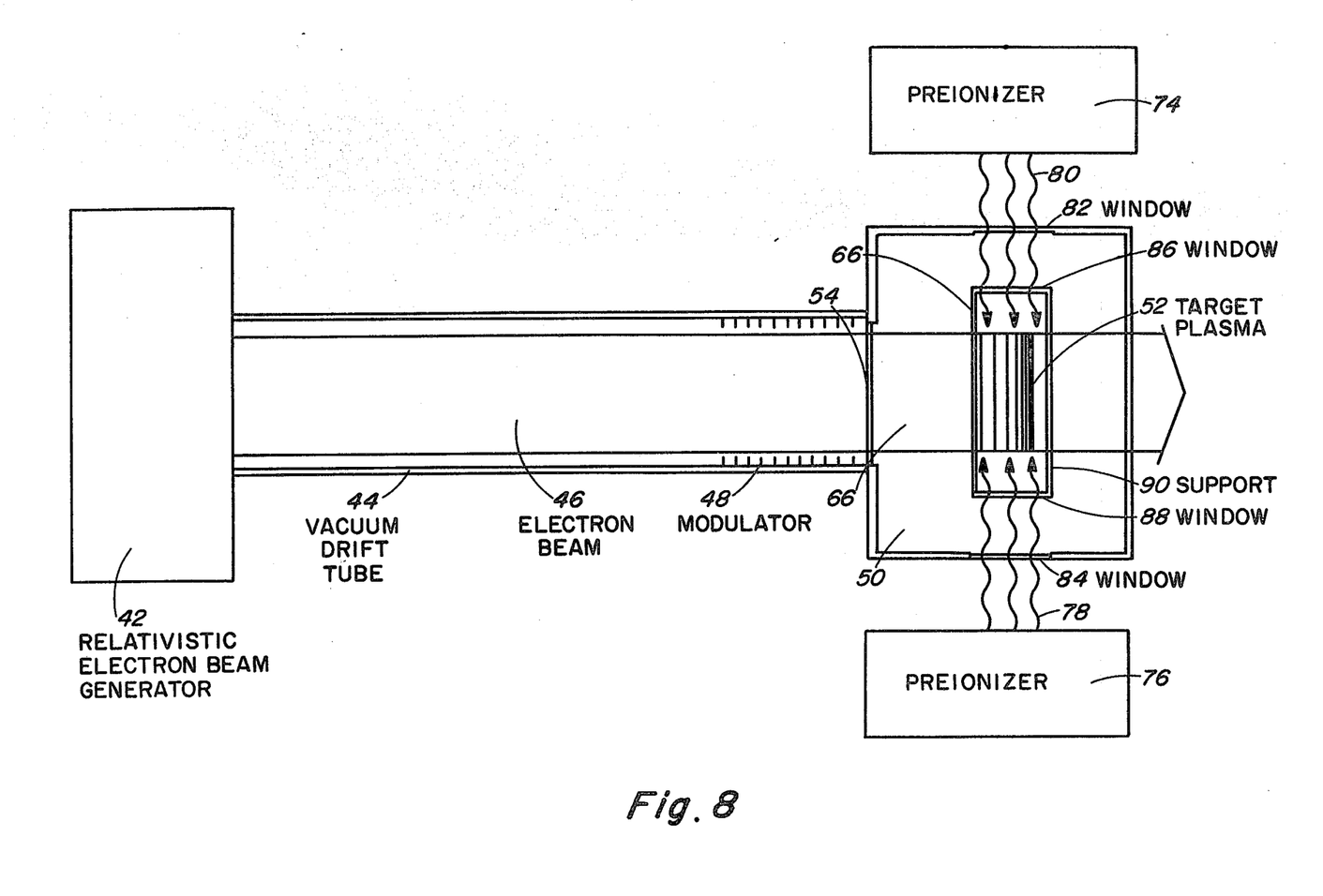
FIG. 8 is a schematic illustration of the preferred embodiment wherein two ionization sources are used.

FIG. 8 is an alternative arrangement in which two preionizers 74 and 76 apply dual preionization beams 78 and 80 transverse to the axis of the electron beam 46. Windows 82 and 84 in the low density gas chamber and 86 and 88 in the target plasma chamber allow passage of the preionization beam to the target plasma 52.

Figure 9:
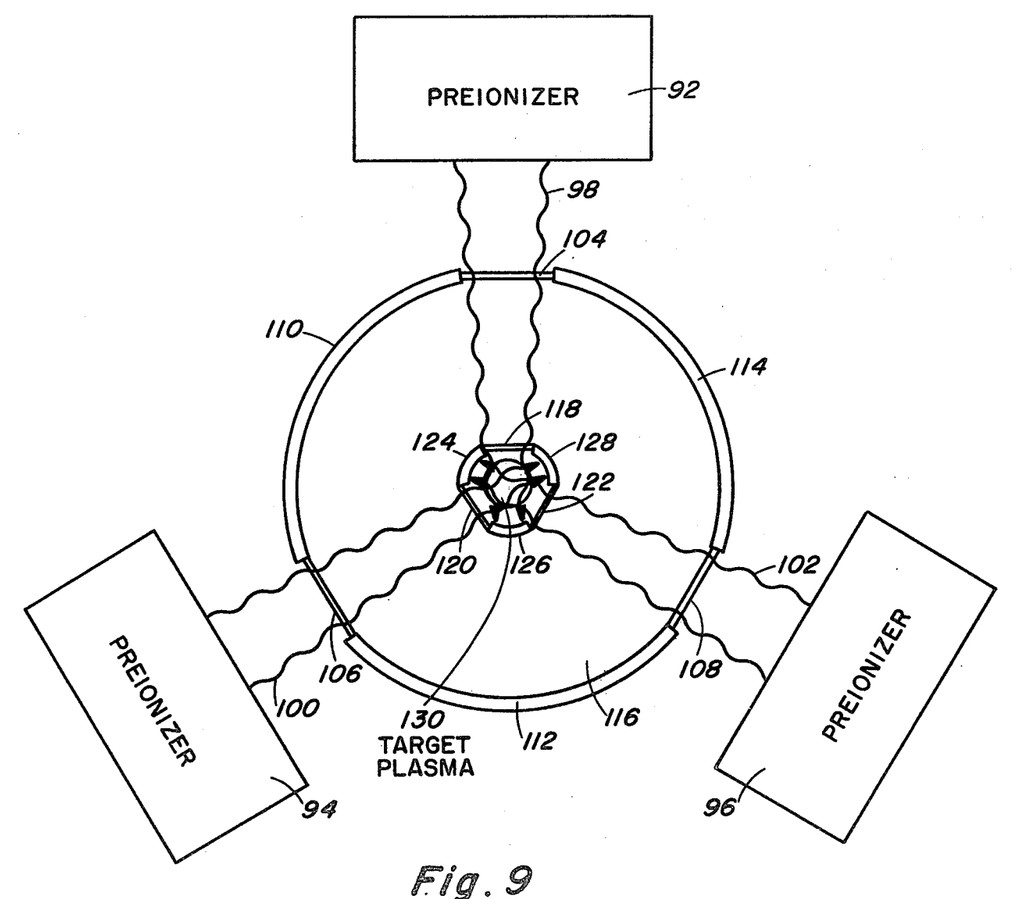
FIG. 9 is an end view of the system of the preferred embodiment utilizing three ionization sources.

FIG 9 is a schematic end view of an additional alternative arrangement utilizing three preionization sources 92 through 96 which produce three ionization beams 98 through 102 penetrating windows 104 through 108 of the low density gas chamber structure 110 through 114. The target plasma chamber comprises support structure 124 through 128 and windows 118 through 122 which provide ionization beams 98 through 102 access to the target plasma. Sapphire or salt is used as the window material for both the low density gas chamber and target plasma chamber when HF or $CO_2$ lasers are utilized as preionization sources. The advantage of the arrangement shown in FIG. 9 is that a multiplicity of preionization sources can be respectively arranged in an off-axis position such that their beams are not directed at each other causing possible damage. Of course, the ability to utilize a mulitiplicity of preionizers reduces capital costs by reducing the individual output of each preionizer required to fully preionize the target plasma 130.

Referring again to the modulator 48 which is schematically illustrated in FIGS. 7 and 8, the purpose of the modulator is to provide improved stability of the relativistic electron beam 46 within the low density gas chamber 50, as well as improved coupling efficiency to the target plasma 52.

Figure 10:
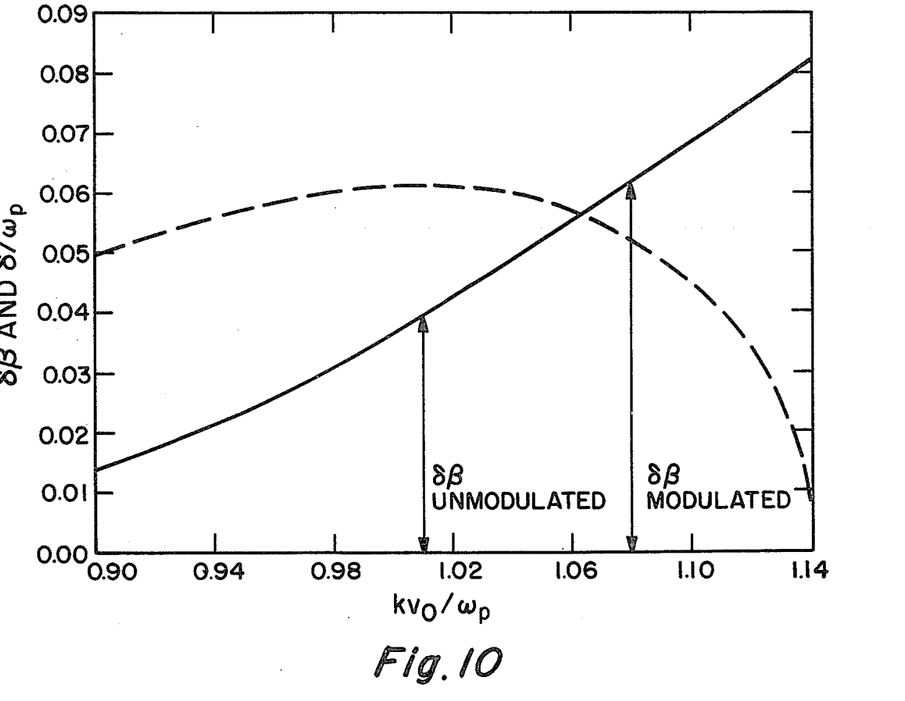
FIGS. 10, 11, and 12 are graphs illustrating the operation of the modulator on the relativistic electron beam.

As shown in FIG. 10, the characteristic growth rate (dashed line) and the characteristic change in beam velocity (solid line) $\delta\beta = 2(\beta_0 - \omega/kc)$ resulting from waves propagating along the relativistic electron beam axis due to the streaming instability are shown as a function of the wave number $k = 2\pi/\lambda$. The initial beam velocity is $v_0$, the wavelength of unstable electrostatic oscillations is $\lambda$, $\omega/k$ is the phase velocity associated with the electrostatic oscillation, $\beta_0 = v_0/c$, and c is the speed of light. Note that the growth rate is relative to the target plasma frequency $\omega_p$. For an unmodulated beam the nonlinear evolution of the streaming instability is determined by the fastest growing wave, which occurs for example, at $kv_0/\omega_p = 1.01$ in FIG. 10. The beam energy loss $\delta\gamma = \gamma^3\delta\beta/(1+\gamma^2\beta\delta\beta)$ is thus determined by the unmodulated $\delta\beta$ shown in FIG. 10. However, by modulating the beam at a wavelength and phase velocity slightly shorter and slightly lower than the fastest growing wave, as shown in FIG. 10, the beam energy loss $\delta\gamma = \gamma^3\beta\delta\beta/(1+\gamma^2\beta\delta\beta)$ is then determined by the modulated $\delta\beta$. Comparing the unmodulated and modulated $\delta\beta$, the increase in the coupling efficiency is $\alpha = 1.0-1.5$ due to the modulator.

Figure 11:
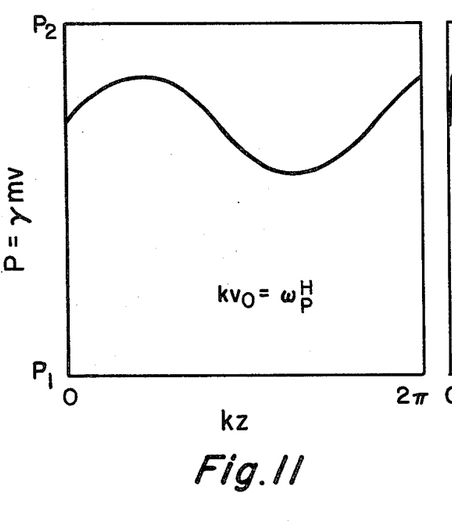
Figure 12:
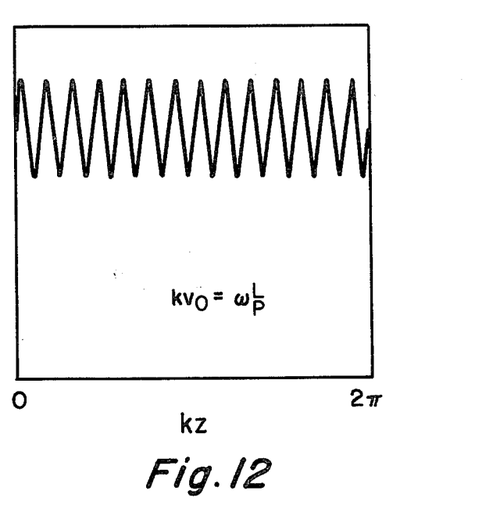

FIG. 11 illustrates the modulated beam as it appears in phase space. The spatial distance is equal to one wavelength of the instability in the dense plasma. In contrast, FIG. 12 illustrates the beam phase space that appears in the low density gas chamber. As is apparent, the relatively short wavelength modulation in the low density interaction establishes an effective beam temperature which retards the development of the instability in the low density gas chamber, in contrast to FIG. 10 wherein the characteristic $\delta\beta$ of the instability is enhanced to provide improved energy deposition from the relativistic electron beam.

Figure 13:
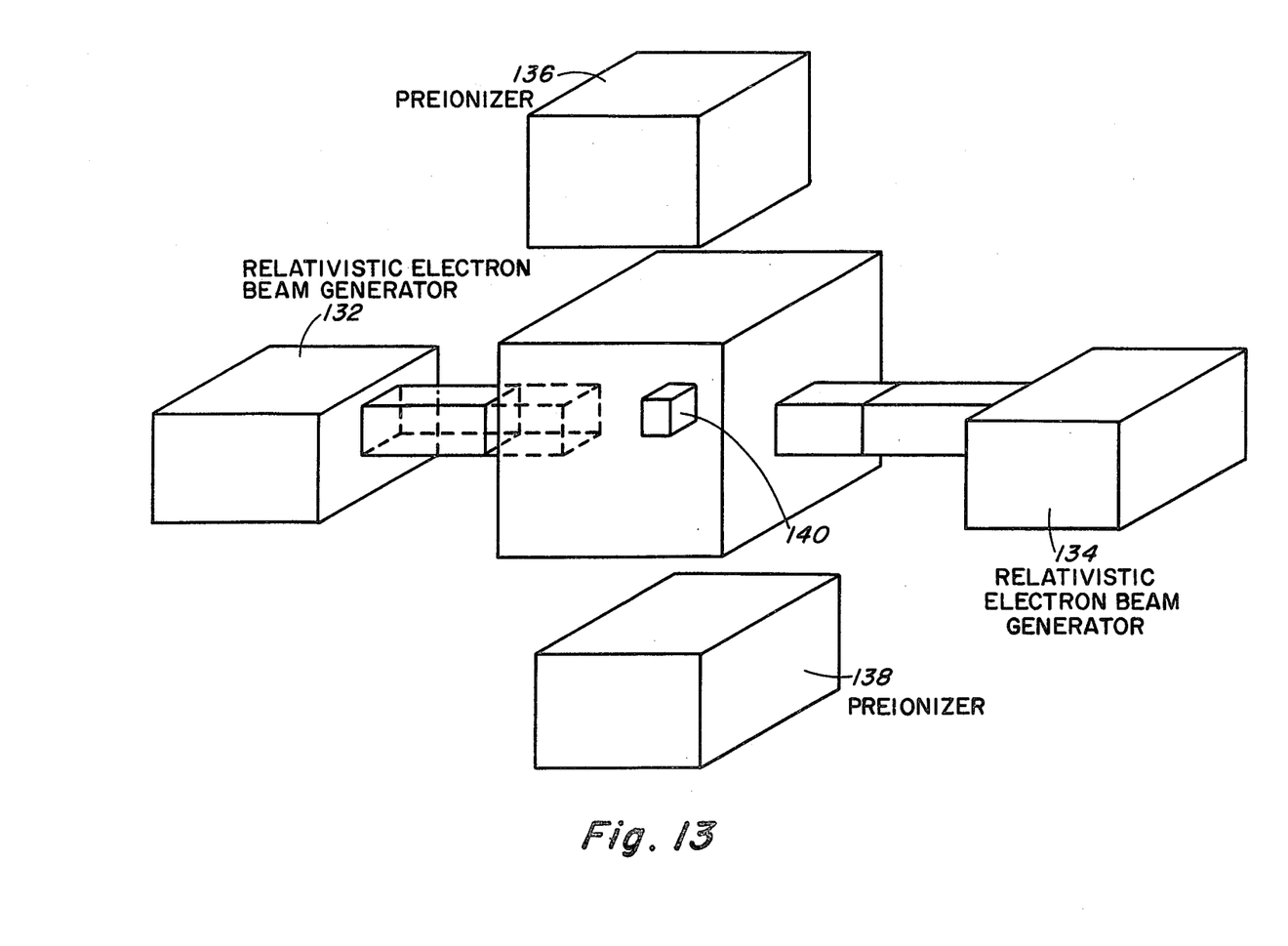
FIG. 13 is an alternative embodiment utilizing two relativistic electron beams.

FIG. 13 is a block diagram of an alternative embodiment utilizing two relativistic electron beams which deposit energy in the target plasma 140. As shown, two preionizers 136 and 138 are applied transverse to the axis of the electron beams of generators 132 and 134. In the arrangement of FIG. 13, the relativistic electron beams are designed to deposit their energy in the target plasma 140 prior to intersecting one another.

The present invention therefore provides a unique method and device for relativistic electron beam heating of a high density plasma. The present invention optimizes the extremely powerful streaming instabilities to heat a high density plasma requiring minimal confinement time. Unlike prior art experimentation, $\nu/\gamma \approx 1$ beams having high voltages are utilized to enhance the streaming instabilities. As a result, interaction of the plasma is initiated within a small localized region of energy deposition of the electron beam to provide energy in the form of radiation, neutrons, and alpha particles.

Obviously many modifications and variations of the present invention are possible in light of the above teachings. For example, various applications of the present invention may not require the use of the external magnetic field, preionizer, low density gas chamber, modulator, or drift tube, either alone, or in combination. It is therefore to be understood that within the scope of the appended claims the invention may be practiced otherwise than as specifically described.

What is claimed is:

1. A device for relativistic electron beam heating of a high density plasma to kilovolt temperatures comprising:
    means for generating a relativistic electron beam having a particle voltage of at least 3 MeV, a current density of at least 1 kA/cm$^2$, and a low relativistic electron beam temperature along the stream line of said relativistic electron beam;
    means for producing a plasma having a density exceeding 10$^{17}$ particles/cm$^3$;

means for applying said relativistic electron beam to said plasma to maintain said relativistic electron beam temperature along the stream line of said relativistic electron beam at a level sufficiently low to produce convective wave oscillations in said plasma, said convective wave oscillations created by relative drift between electrons of said relativistic electron beam and electrons of said plasma resulting from two stream and upper hybrid instabilities produced in said plasma by said relativistic electron beam;

whereby relativistic electron beam energy is deposited in said plasma to locally heat a small volume of said plasma to kilovolt temperatures at an efficiency which is a function of the strength parameter S, where:

$$S \equiv (\gamma - \gamma^{-1})(n_b/2n_e)^{\frac{1}{3}}.$$

2. The device of claim 1 further comprising means for premodulating said relativistic electron beam at a wavelength and phase velocity slightly shorter and lower than the wavelength and phase velocity of said convective wave oscillations.

3. The device of claim 1 wherein said plasma comprises DD.

4. The device of claim 1 wherein said plasma comprises DT.

5. The device of claim 1 wherein said plasma comprises HB.

6. A device for relativistic electron beam heating of a high density plasma to kilovolt temperatures comprising:

means for generating a relativistic electron beam having a particle voltage exceeding 3 MeV, a current density exceeding 1 kA/cm$^2$, and minimal scattering so as to produce a low relativistic electron beam temperature along the stream line of said relativistic electron beam;

a plasma having a density exceeding 10$^{17}$ particles/cm$^3$;

plasma chamber means for containing said high density plasma;

a foil forming a portion of said plasma chamber means, said foil having an effective Z sufficiently low to maintain said low relativistic electron beam temperature of said relativistic electron beam along its stream line to produce convective wave oscillations in said plasma, said convective wave oscillations created by the relative drift between electrons of said relativistic electron beam and upper-hybrid instabilities produced in said plasma upon application of said relativistic electron beam to said plasma;

whereby relativistic electron beam energy is deposited in said plasma to locally heat a small volume of said plasma to kilovolt temperatures at an efficiency which is a function of the strength parameter S, where $$S \equiv (\gamma - \gamma^{-1})(n_b/2n_e)^{\frac{1}{3}}.$$

7. The device of claim 6 further comprising means for initiating electron bunching in said relativistic electron beam at a wavelength and phase velocity slightly shorter and slightly lower than the wavelength and phase velocity of said convective wave oscillations.

8. The device of claim 6 wherein said plasma comprises DD.

9. The device of claim 6 wherein said plasma comprises DT.

10. The device of claim 6 wherein said plasma comprises HB.

11. The device of claim 7 wherein said plasma comprises DD.

12. The device of claim 7 wherein said plasma comprises DT.

13. The device of claim 7 wherein said plasma comprises HB.

14. A device for producing kilovolt plasmas comprising:

means for generating a relativistic electron beam having a particle voltage exceeding 3 MeV, a current density exceeding 1 kA/cm$^2$, and minimal scattering so as to produce a low relativistic electron beam temperature along the stream line of said relativistic electron beam;

chamber means for retaining a gas within a predetermined volume at a density of at least 10$^{17}$ particles/cm$^3$;

means for ionizing said gas to produce a plasma having a density of at least 10$^{17}$ particles/cm$^3$;

a foil forming a portion of said chamber means, said foil having an effective Z sufficiently low to maintain said low relativistic electron beam temperature along the stream line of said relativistic electron beam to enhance convective wave oscillations created by the relative drift between electrons of said relativistic electron beam and electrons of said plasma, said convective wave oscillations being generated as a result of two stream and upper-hybrid instabilities produced in said plasma upon application of said relativistic electron beam to said plasma;

whereby relativistic electron beam energy is deposited in said plasma to locally heat a small volume of said plasma to kilovolt temperatures at an efficiency which is a function of the strength parameter S, where $$S \equiv (\gamma - \gamma^{-1})(n_b/2n_e)^{\frac{1}{3}}.$$

15. The device of claim 14 further comprising means for initiating electron bunching in said relativistic electron beam at a wavelength and phase velocity slightly shorter and slightly lower than the wavelength and phase velocity of said convective wave oscillations.

16. A method of heating a high density plasma to kilovolt temperatures comprising the steps of:

generating a relativistic electron beam having a particle voltage of at least 3 MeV, a current density of at least 1 kA/cm$^2$, and a low relativistic electron beam temperature along its stream line;

producing a plasma having a density of at least 10$^{17}$ particles/cm$^3$;

applying said relativistic electron beam to said plasma to produce convective wave oscillations in said plasma created by the relative drift between electrons of said relativistic electron beam and electrons of said plasma, said relative drift being generated as a result of two stream and upper-hybrid instabilities, causing relativistic electron beam energy to be deposited in said plasma to locally heat a small volume of said plasma to kilovolt temperatures at an efficiency which is a function of the strength parameter S, where:

$$S = (\gamma - \gamma^{-1})(n_b/2n_e)^{\frac{1}{3}}.$$

17. The method of claim 14 further comprising the step of initiating electron bunching in said relativistic electron beam at a wavelength and phase velocity slightly shorter and slightly lower than the wavelength and phase velocity of said convective wave oscillations.

* * * * *